Dec. 22, 1942.     H. T. WHEELER     2,306,146
POLY-SEGMENTAL PACKING RINGS
Filed June 17, 1939     2 Sheets-Sheet 1
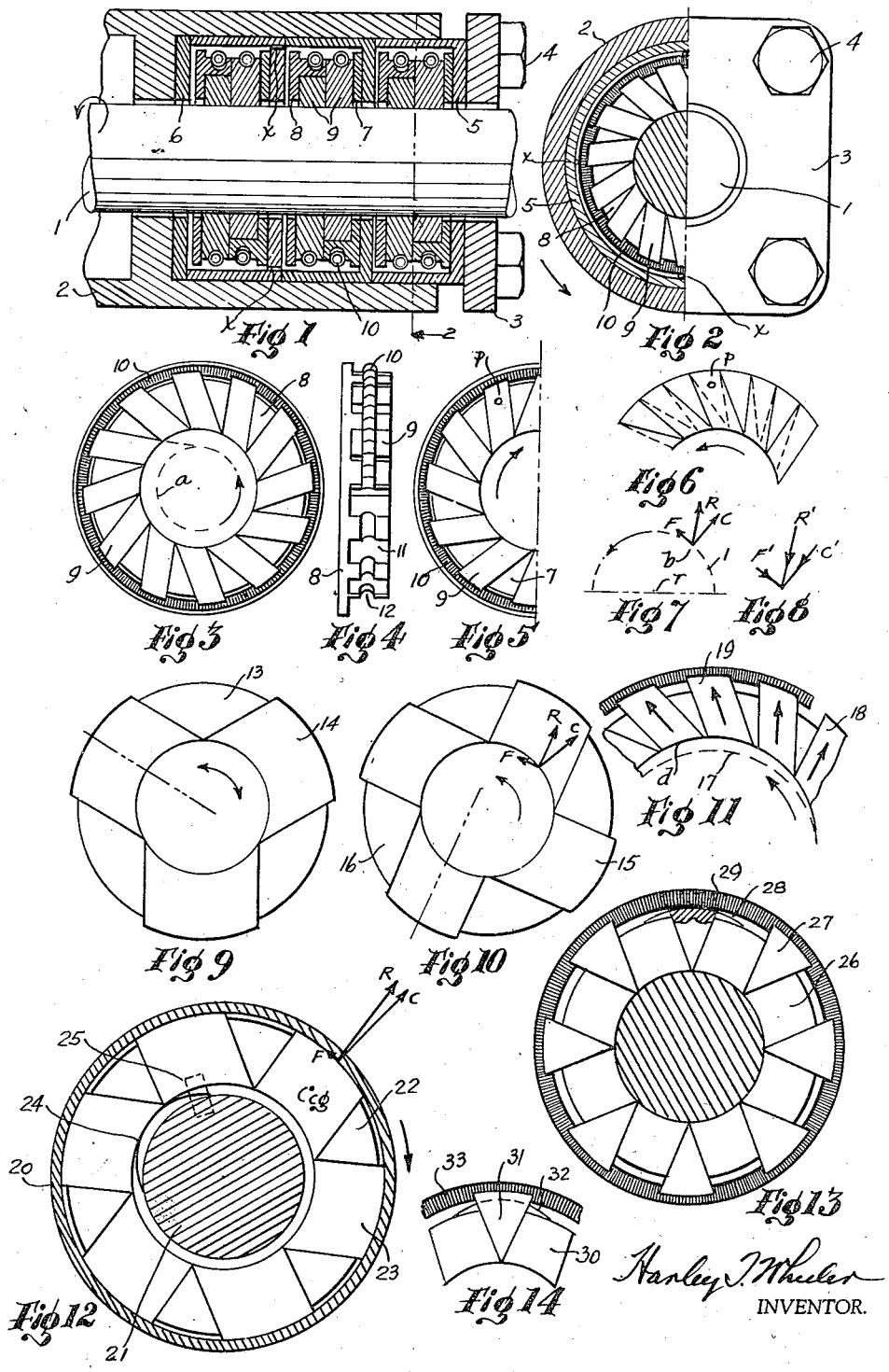
Harley T. Wheeler
INVENTOR.

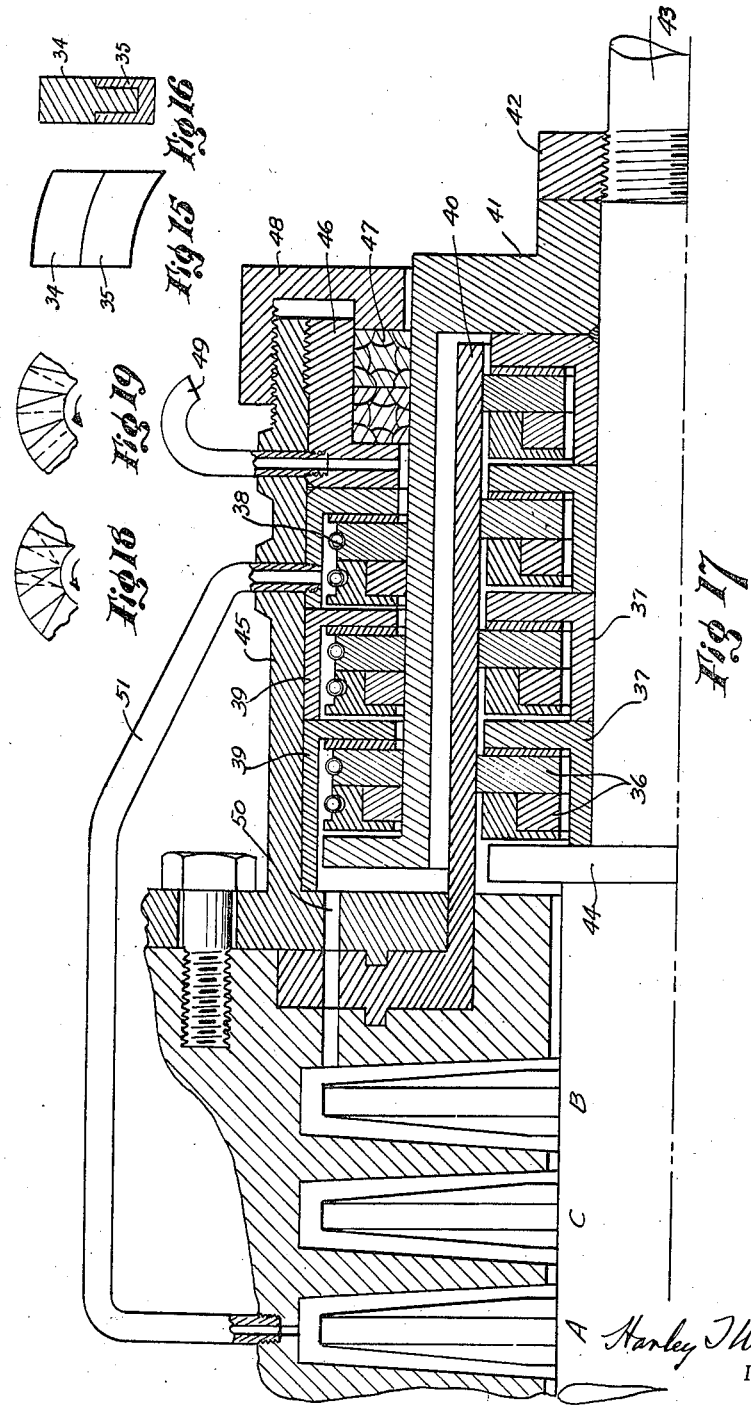

Patented Dec. 22, 1942

2,306,146

UNITED STATES PATENT OFFICE 2,306,146

POLYSEGMENTAL PACKING RING

Harley T. Wheeler, Dallas, Tex.

Application June 17, 1939, Serial No. 279,683

2 Claims. (Cl. 286—7)

This invention relates to a multi-segment packing to seal fluid pressure around rotating shafts and its chief advantage is the extreme movability of the segments during vibrations of the shaft.

One advantage is that the segments may be made of materials which have very low coefficients of friction requiring very little power to operate the device.

Another advantage is that the disc which contains the segments is self-centering about the center line of the rotating shaft.

Still another advantage is that the sealing surfaces are independent of the machine body and misalignment of parts caused by expansion or contraction.

Yet another advantage is that the movement of the segments caused by shaft vibration is in a direction creating the least resistance to change of their position.

An important advantage is that during movement of the segments away from the shaft on account of vibration, fluid flows against the shaft to reduce the friction created, a unique feature not found in any other forms of packing.

An additional advantage is that shaft vibration moves the segments, yet does not interfere with sealing capability.

An advantage of great importance is that the segments may be arranged to develop very high sealing capability by means of centrifugal force originating from rotation of the shaft.

With these advantages in view, other details are disclosed in the specification to follow which is accompanied by the drawings wherein:

Figure 1 is a cross-sectional view of a poly-segmental packing made according to this invention, as applied to the stuffing of a centrifugal pump.

Figure 2 is an end view of Figure 1, along line 2 of Figure 1.

Figure 3 is an end view of a sealing disc used in Figure 1.

Figure 4 is a side view of a sealing disc.

Figure 5 is an end view of a companion disc.

Figure 6 shows the arrangement of joints of a pair of right and left hand discs arranged face to face.

Figure 7 shows the force vectors which influence the position of the segments in a disc.

Figure 8 shows the counter forces which act on a segment.

Figure 9 shows the simplest practical form, a three-segment disc.

Figure 10 shows a four-segment disc.

Figure 11 shows the effect of shaft vibration in moving the segments.

Figure 12 shows a shaft driven disc or rotor, wherein the segments seal by centrifugal force.

Figure 13 shows a poly-segmental ring with loose division at sectors.

Figure 14 shows the detail of holding a segment under tension.

Figure 15 shows an end view of a weighted segment.

Figure 16 is a cross-sectional side view of Figure 15.

Figure 17 shows a cross section of a high pressure multistage pump wherein packings made according to this invention seal the shaft.

Figure 18 shows opposing tangential joints in combination.

Figure 19 shows a combination of radial and tangential joints.

Referring now to Figure 1, a rotatable shaft 1 situated within a stuffing box of a pump frame 2, and a set of packing held in place by gland 3 and studs 4. The packing unit as shown is a multi-compartment type, three identical cups held in pressure tight relation against washer 6 in the bottom of the box. Within each compartment are poly-segmental packing units made according to this invention each consisting of a sealing disc 7 and a pressure-breaker disc 8, both containing segments 9, held against the shaft by spring 10, the relation of these parts being described in other figures. Figure 2 shows in partial cross-section an end view of a disc and its segments.

Figure 3 is an end view of disc 8, a complete assembly with segments 9 and tension spring 10 as situated in a compartment. The disc 8 is an annular ring as shown by Figure 4 with parallel sided slots 11 cut in the face, in which parallel-sided segments 9 may be placed with suitable clearance. The slots and segments as shown are equally spaced and of uniform width but it should be apparent that unequal spacing and varying widths can also be used. A groove 12 cut in the periphery permits spring 10 to contract as the segments are worn by use and prolongs the period of usage of the latter. The upper half of Figure 4 shows segments 9 in place, the lower having empty slots 11. Each segment has a groove cut in the outer end in which tension spring 10 nests to force the segment toward the shaft. As may be seen in Figure 3, one side of each segment slot is made tangent to circle $a$, for reasons which will be later explained. The preferred direction of shaft rotation for this segment arrangement is shown by the arrow.

In Figure 5 is shown the companion disc 7 for sealing the compartment, consisting of tangential slots arranged in an opposite direction to that of disc 8, containing segments 9 tensioned by spring 10. When discs 7 and 8 are placed face to face as shown in Figure 1, the segments in both discs are tangential in the same direction as shown in Figure 6, the joints off-set so that the segments of disc 8 cover the joints of those of 7 to reduce the passage of fluid under pressure.

Previous efforts to construct rotary segmental packings have not been successful. This is mainly due as my investigations have shown, to improper relations of segment contact lengths to the degree of rotative speed. Too long a packing contact such as an annular ring against a high speed rotating shaft wipes off or excludes the fluid which should be utilized to lubricate the sealing joint, resulting in temperature rise and rapid wear. For a fluid to act as a lubricant it must entirely saturate the sealing surface of a porous material, or be present as a film between a non-porous segment and the shaft. This invention is an improvement of my original idea shown by copending application for Letters Patent, Serial Number 266,565 filed, April 7, 1939, and is adaptable to higher temperature than rubber will withstand particularly when vibration is to be absorbed or compensated.

If the segment covers too much of the shaft periphery only the toe of a porous segment will be saturated, the middle section and the heel will be dry owing to heat developed. The contact of a non-porous segment must be short enough to enable fluid to be pulled under it by the speed of rotation considered. The poly-segmental arrangement of Figure 3 meets the requirements of high rotative speed with vibration always present and enables the satisfactory use of such porous materials as carbon, compressed asbestos, and laminated phenol-formaldehyde products, or non-porous metals and compositions having favorable frictional values.

Referring now to Figure 7, showing the periphery of shaft 1, and a particle $b$ in the face of a segment bearing against the shaft. Assuming shaft vibration in the direction vector C in the amount of $mv^2/r$, formula for centrifugal force in which $m$ is the mass of the shaft, $r$ the radius or distance which the geometrical center line of the shaft is from the center of rotation, and $v$ the velocity of the center of gravity of the shaft around the center of rotation.

F is the frictional force created between the shaft surface and that of the segment, tending to move the latter in the direction of rotation as shown. R, the resultant of movements F and C is the direction in which the segment would be moved outwardly from the shaft surface. To reduce friction between the segment and the sides of the disc slot, the slot is made parallel to resultant R, which results in straight line movement of the segment as it responds to shaft vibration. The circle $a$ of Figure 3 is an extension of resultant R by which all segments in the rotor may be aligned.

In Figure 8 is shown the resisting forces which tend to return the segment inwardly as the high side of the vibrating shaft rotates. Resultant R' is a combination of spring tension, fluid pressure and friction due to movement of the segment along the sides of the slot.

The form of Figure 9 is the simplest practical design of the poly-segmental construction, having a disc 13 containing three segments 14. Two segments in a disc is not practical and will seal a shaft only with excess leakage. The segments are shown with their center lines coincident with radii and the rotation may be in either direction for very slow moving shafts which do not wipe the contact surfaces dry nor create enough friction from vibration to necessitate placing the segment tangentially as in Figure 3. It is considered that slow movement will not exclude fluid from the long segment contact surfaces as shown.

As speed is increased the length of the controlling faces of the segments must be decreased for reasons before mentioned, necessitating more segments to cover the shaft periphery. Figure 10 shows four segments 15 in a disc 16, and it is now considered that greater speed accompanied by vibration will bring into effect the resolution of forces explained by Figure 7, requiring the tangential arrangement of the segments as shown. The center lines of the segments pass to one side of the disc center and therefore contact the shaft surface at an angle. It should be understood that a greater degree of vibration for any one speed increases the friction created by the segment and that greater speed for any given degree of vibration also increases the friction. In like manner the considerations of obtaining necessary lubrication by controlling the saturating capability of porous, or the size of non-porous segments, the effect of vibration on the angle of the segment and the limiting factors of overlapping joints as shown by Figure 6, bring about the multi-segment design of Figure 3. The degree of pressure to be sealed by any design is a matter to be determined by one skilled in the art of such manufacture and having experience with operation and it is considered he is able to choose from a variety of available materials those which will obtain results required.

The instantaneous effect of shaft vibration on the assembly of segments is shown by Figure 11. The ideal shaft rotating about its geometrical center without vibration is shown by position 17. Position A shows the shaft in a period of vibration which results for all cases in one half of the shaft periphery being outside of the ideal position 17 and the opposing half being inside. It should be obvious that half of the segments are therefore moving outwardly at the same time the opposite half are moving inwardly, and that this relation obtains successively and continuously as the off-center shaft rotates. Near the axis of neutral movement segment 18 is moved but slightly while at the maximum point of deflection segment 19 makes the greatest movement. Each segment moves thru a cycle and returns to its original position. The segments of Figure 11 move in straight line motion as shown by the arrows, guided by the slots in the disc face, with a minimum of friction against the slot faces, due to the angular positions as determined by the force vectors of Figure 7. The direction of shaft motion can be reversed and the packing will seal, but at lower speeds and able to withstand a less degree of vibration and with much greater slot friction and shorter life of the wearing parts. It is my discovery that the relations as set forth are necessary for highest efficiency.

The operating characteristics of the rotary seal disclosed by Figures 1 to 11 are best explained by reference again to Figure 1. The discs 7 and 8 have a clearance at their peripheries which is much smaller than the clearance about the inner surfaces adjacent to the shaft. The tendency of the discs is to center themselves about the shaft, whether the latter is idle or rotating, due to the segments 9 seeking positions of least strain under tension of the spring 10 which constantly equalizes. As it may be assumed that a rotating shaft always vibrates to some extent, at some time during the period of operation, the segments moving in the slots as shown by Figure 11. These movements result in instantaneous thrusts against the sides of the slots of the rotors and the friction of contact produces sufficient resistance to cause the rotors to revolve slowly, or crawl in the direction of shaft rotation. If the shaft is very quiet the discs will remain in one position. Tendency to change of position increases with the degree of vibration or speed increase. As the outer clearance is less than the inner, the inner surface of the cup 5 guides them and prevents contact with the shaft. The pair of discs will move in unison due to the pin $p$ in a segment of Figures 5 and 6 fitting into a space of the opposing disc. To provide an escape for exceedingly high pressures down stream and relieve the pressure thrust against the segments apertures are made in the compartment walls. These may be varied as to size and number and placed in one or more of the division walls.

The sealing characteristics of the segmental designs shown in Figures 1 to 11 are determined by the ability of the segments to move outwardly in the disc slots and then inwardly as the shaft vibrates, to effect a constant seal with such allowance of fluid seepage thru the joints as is necessary for lubrication. The change of position of the discs in self-centering action is always slow or intermittent, while the segment movement is instantaneous and in unison with shaft movement. The sealing surface is that of the shaft which is in a constant state of change of position. It should therefore be obvious that there are combinations of excessive speed, great vibration or high viscosity of liquids handled which would retard the return action of the segments and are therefore limiting factors. Under such conditions I have found that increasing the spring tension and making other minor changes do not correct such lack of ability to seal.

To create a device having greater sealing capability, I have discovered that the use of centrifugal force is sufficient when applied from within the sealing segments. Reference is now made to Figure 12, the end view of a centrifugally operated sealing unit. The sealing surface is the inner surface of the cylinder 20 which preferably is rigidly mounted on the machine frame, its longitudinal center line approximately coincident with that of the shaft 21. The disc or rotor 22 is similar to the disc 8 of Figure 4, having slots cut in the face in which are inserted segments 23. Each segment is tensioned outwardly by such a device as spring 24, this spring action by the segment assembly tending to center the rotor about the shaft. The propulsion of the rotor is provided, for example, by pin 25, imbedded in the shaft and positioned in a socket in the inner rotor face. The clearance between the shaft and rotor is such that the outer surface cannot touch the wall of cylinder 20.

Rotation of the shaft causes each segment to exert force outwardly according to the relation $mv^2/r$ herein before explained. The centrifugal force of this design acts thru the center of gravity $cg$ of a segment, in a radial direction, as vector C. The contact of the segment with wall 20 during rotation produces friction F, and resultant R is the direction of attempted movement of the segment under the influence of the two forces. To obtain straight line motion, at a minimum expense of friction between segments and slot walls, the slots are made parallel or coincident with the resultant R, as the position of the center of gravity may determine.

Referring to Figure 17 the pair of sealing rotors 36 are right and left hand designs of Figure 12, the segments placed face to face and the joints off-set similarly to Figure 6.

Each pair of rotors is confined between flanges 37, 37, with clearance endwise for expansion and contraction. The thrust of the fluid in a down stream direction forces the rotors together making substantially pressure tight faces between them. The outwardly acting centrifugal force of each segment is so much greater than the friction between the segment and slot walls of the rotor and that of the rotor and the compartment face that as shaft vibration occurs the segments remain at their outmost position and the rotor vibrates independently of the shaft and the segments, its movement limited by predetermined clearances before mentioned.

Such materials as carbon, various metals with low friction values and compositions may be used as the segments. For increasing the acting centrifugal force the segments may be attached to heavier materials such as lead. Figures 15 and 16 show segment tip 34 attached to a heavier material 35 which increase the centrifugal force in direct proportion to the added weight. Further increase in centrifugal force may be obtained by positioning the weights farther from the rotative center. The sealing force may be further increased by faster rotation, and multiplies as the square of the increased velocity. Transversely, for any given position and weight of segment at any certain speed, the fluid pressure may be regulated to balance the mechanical thrust of centrifugal force and effect a correct seal.

The force opposing the outward thrust of the rotating segments is the pressure present in the fluid which attempts to escape along the cylinder wall, its source of energy being from such a device as a multistage centrifugal pump, cross-sectioned in Figure 17. The fluid while attempting to escape works in between the segment contact surfaces and the wall, exerting an inward force. This design provides ample lubrication when the fluid pressure is less than the exerted unit centrifugal force of the segments, as the rotation will also throw the liquid outwardly thru the segment joints to be drawn between the segment rubbing surfaces and the wall. If the fluid pressure is greater than that of the segmental centrifugal force, excess leakage past the rotors will result, which may be counterbalanced by increasing weight or the radius of the segment, or increasing rotor speed.

A variation of the solid annular ring type of disc is shown in Figure 13. The segments 26 are parallel-sided, being spaced by wedges 27, the latter held in place against adjacent segments by spring 29. It should be obvious that as the segments 26 wear and move toward the rod the wedges 27 remain in their original position and do not move toward the shaft, unless the segments wear on the sides. Flat spring 28 situated under coil spring 29 pushes the segments 26 against the shaft. In operation, pressure of the fluid in the compartment presses the segments 26 against the shaft with much more tension than the spring 28.

Figure 14 shows that the segments 30 need not be parallel-sided. Wedge 31 has a greater included angle than 27 of Figure 13. The combination spring tension of flat 32 held by coil 33 provide the same tensioning means as those described in Figure 13.

Figure 17 shows a complete assembly of a 3-stage centrifugal pump, sealed with the centrifugal force rotors of Figure 12 in the inner compartments 37, 37 and the stuffing-box type rotors 38 of Figure 3 in the outer compartments 39, 39. The rotors 36 press outwardly against the cylinder 40 which is fixed to the machine frame and the discs 38 press inwardly against the revolving drum 41 which by means of jam nut 42 on shaft 43 compresses the compartments 37 pressure tight against the shaft shoulders 43. The compartments 39 are held pressure tight in casing 45 by jam nut 46, the latter also forming a stuffing box to receive the soft packing rings 47 held in place by gland 48 to direct overflow leakage thru pipe 49.

Pressure in the pump chamber is generated by the rotation of impellers A, B, and C first, second and third stages respectively. Passage 50 provides a leak-off from the centrifugal rotors 36 back to the second stage B to equalize the pressure excess or deficiency at the bleeding point. Pipe 51 provides a passage to the first stage A to bleed or lubricate the last rotors 38.

It should be seen that by using the two types of discs, of inward and outward movement, that all advantages of diameter, rate of speed and the available space may be utilized to seal very high pressures under the disadvantages of continuous vibration.

The emphasis of segment placement thruout this specification has been on the leading angular position to obtain efficiency for general applications. For special conditions however there are exceptions. Referring to Figure 18, the sealing segments are shown in solid lines, leading the direction of rotation while the pressure-breaker segments dotted, are trailing tangentially. This arrangement provides excess lubrication for the joints and contacts of the leading segments.

Figure 19 shows sealing segments in solid leading, and dotted pressure-breaker segments radial, for another necessary combination of practice. It should be obvious that an indefinite number of combinations may be made by using these principles and designs and that the specification is not intended to limit them.

It should be obvious that the construction of poly-segmental rings as disclosed in this specification is particularly applicable to rotary motion, but that they may be used on reciprocating oscillating and other motions and combinations.

Having described my invention I now claim:

1. A device for sealing a shaft situated in a stuffing box comprised of a disc about said shaft with a plurality of slots formed in the radial face of said disc, the centerline of each of said slots passing to one side of the center of said disc, and segments interfitting each of said slots and tensioned against said shaft.

2. A device for sealing a shaft situated in a stuffing box comprised of two discs about said shaft, a plurality of parallel-sided slots formed in the adjacent faces of said discs, parallel-sided packing segments interfitting said slots, each of said slots being inclined with respect to a radius through its center and against the direction of rotation so that the resultant of the forces acting on the inner end of each segment lies substantially upon the center line of the segment, and means resiliently urging each of the segments inwardly against said shaft, said segments of the adjacent discs being situated with respect to each other so that the joints are off-set.

HARLEY T. WHEELER.